United States Patent [19]
Gravos

[11] 3,786,786
[45] Jan. 22, 1974

[54] ANIMAL FEEDER
[76] Inventor: Leif H. Gravos, Arnegard, N. Dak. 58835
[22] Filed: Nov. 1, 1972
[21] Appl. No.: 302,747

[52] U.S. Cl............................................. 119/52 A
[51] Int. Cl............................................. A01k 5/00
[58] Field of Search...... 119/54, 52 A, 53.5, 55, 18, 119/61; 221/200, 203, 205, 242

[56] References Cited
UNITED STATES PATENTS
| | | | |
|---|---|---|---|
| 395,855 | 1/1889 | Stevenson | 119/53.5 |
| 1,333,800 | 3/1920 | Fink | 119/54 |
| 1,845,072 | 2/1932 | Beckman | 119/52 A |

Primary Examiner—Louis G. Mancene
Assistant Examiner—Jay N. Eskovitz

[57] ABSTRACT

A feeder for small pigs that stores food in a vertical container. Food deposited in a top opening is taken by the animals at a bottom opening. An integrally built agitator is manually operated from time to time to move the food to the bottom opening.

1 Claim, 2 Drawing Figures

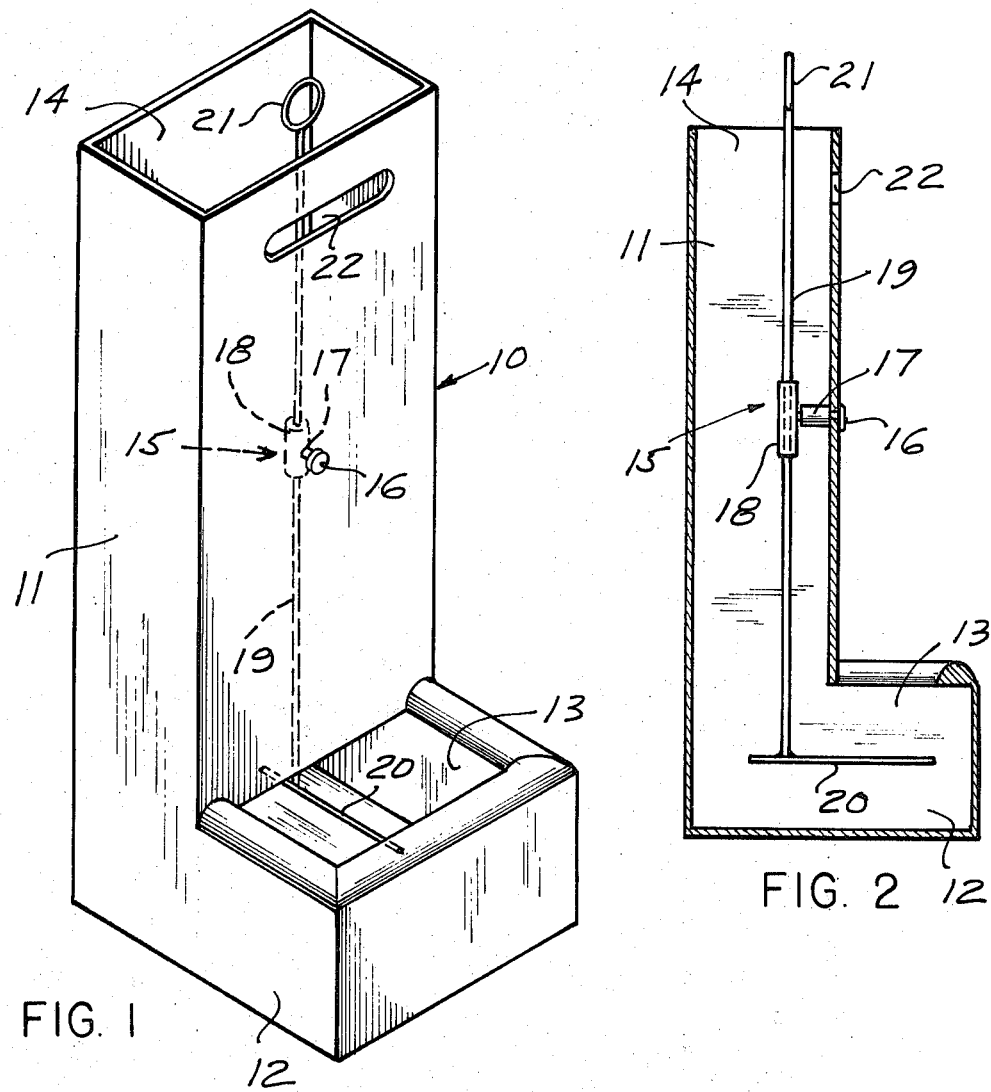

ANIMAL FEEDER

This invention relates to animal husbandry, more particularly to feeders.

A principal object of this invention is to provide a feeder having a top opening and a bottom opening disposed laterally to the food-storing space. The food that drops into the bottom opening can be reached easily. However, as is often the case, the food is of a rough or coarse shape. Such food, having a high angle of repose, will discontinue filling the opening. To overcome this difficulty, the feeder is provided with an agitator rod for periodically bringing the food to its full level at the opening.

Another object of this invention is to provide a feeder of the type described that is simple in construction, yet rugged and low in cost.

These and other objects will be readily evident upon a study of the following specification and the accompanying drawing wherein:

FIG. 1 is a perspective view of the feeder.

FIG. 2 is an elevation section view thereof.

Referring to the figures, a feeder 10 according to the invention comprises a food storage space 11 extending at its lower end into a lateral storage space 12 provided with an opening 13. Storage space 11 is opened at its upper end as at 14.

The figures, particularly FIG. 2 show that food deposited in opening 14 will fill space 11 and then gradually fill opening 13. It becomes evident that removal of food at opening 13 does not insure that food from space 11 will continue to fill opening 13. To make certain that opening 13 is filled so that the animals can easily reach the food, an agitator 15 is added.

Agitator 15 comprises a wall mounted support 16 extending into a bearing 17 in which a slide-tube is pivotted. A rod 19 slides freely in tube 18. Rod 19 terminates at its lower end in a lateral member 20 and its upper end in a handle 21.

It should now become evident from inspection of the figures that a periodic movement of handle 21 from side to side and up and down will keep opening 13 filled with food.

For easy portability a handle 22 in the form of a slot is provided in the front wall of container 11.

What I claim Is:

1. An animal feeder comprising a storage space and an agitator, said storage space having an opening at the top for receiving food and an opening at the bottom for accessibility by the feeding animal, said agitator comprising a rod member slidable in a bearing, said bearing pivotally supported in said feeder, the lower end of said rod extending into the area of said lower opening, the upper end of said rod extending into a handle, said agitator thereby manually movable throughout the space of said lower opening.

* * * * *